July 26, 1960 L. CLEMENS 2,946,167
MACHINE FOR THE MANUFACTURE OF PACKAGES FOR CUT MATERIALS
Filed April 8, 1959 3 Sheets-Sheet 2
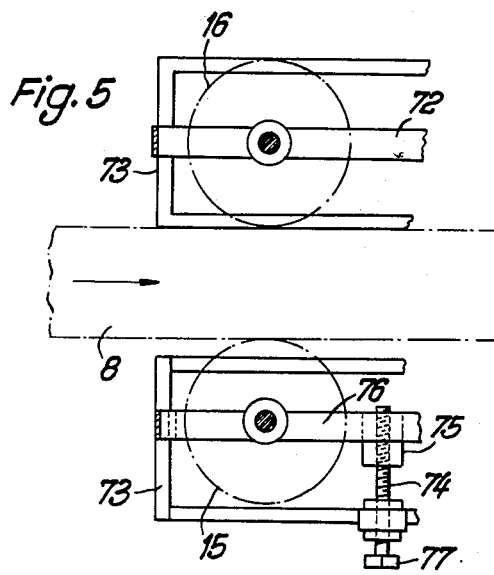
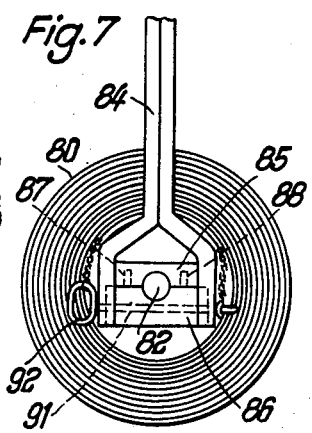
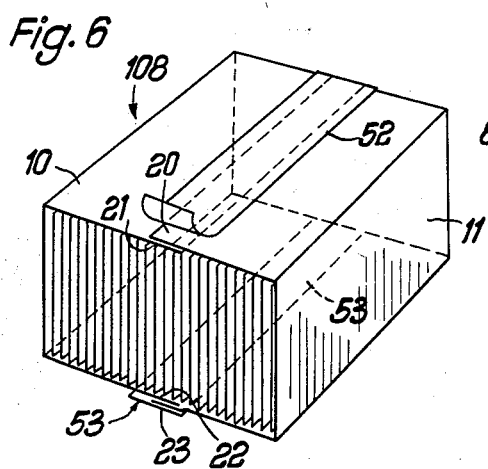
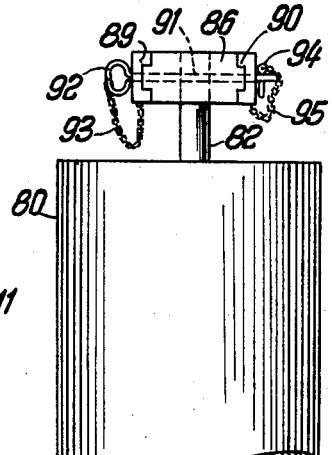
Inventor:
Ludwig Clemens,

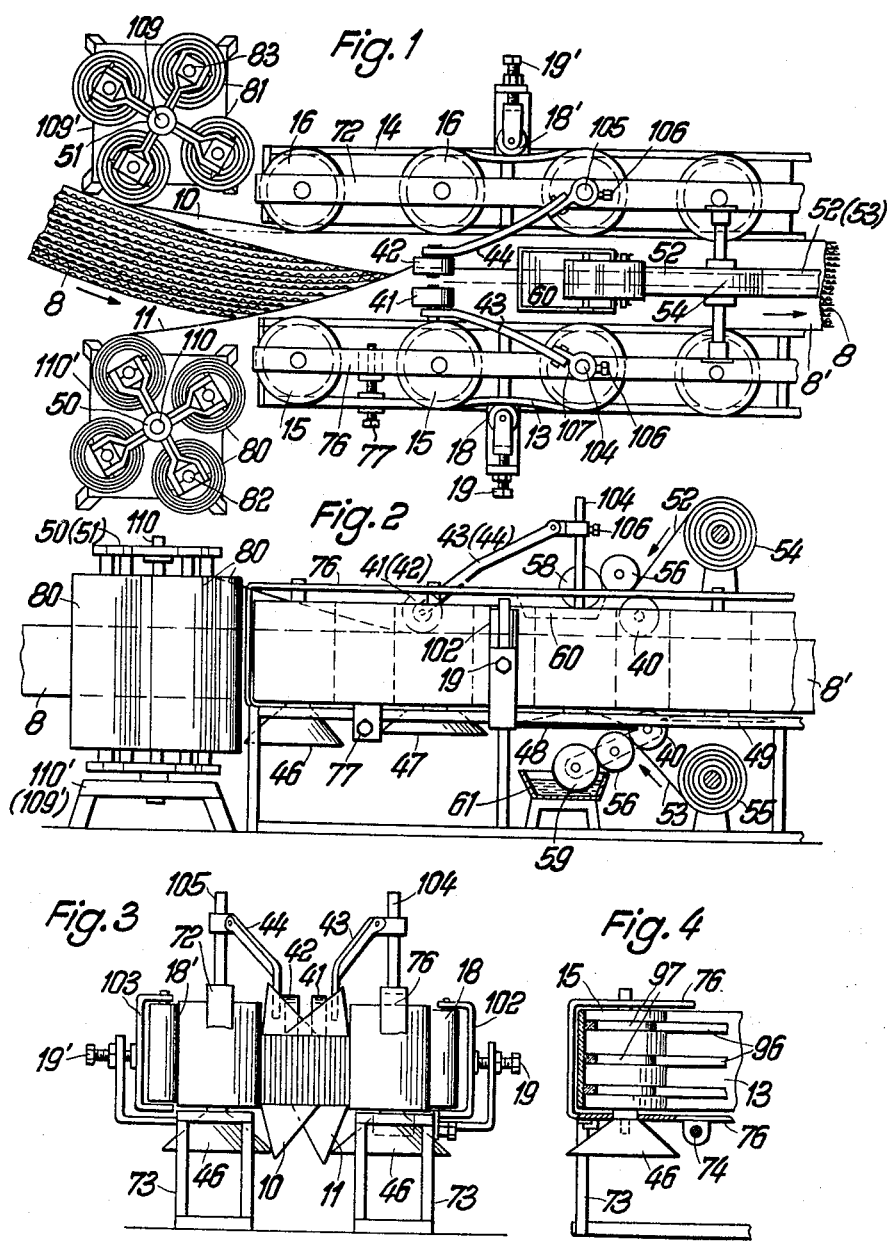
July 26, 1960
L. CLEMENS
2,946,167
MACHINE FOR THE MANUFACTURE OF PACKAGES FOR CUT MATERIALS
Filed April 8, 1959
3 Sheets-Sheet 1
Inventor:
Ludwig Clemens,
His Attorney.

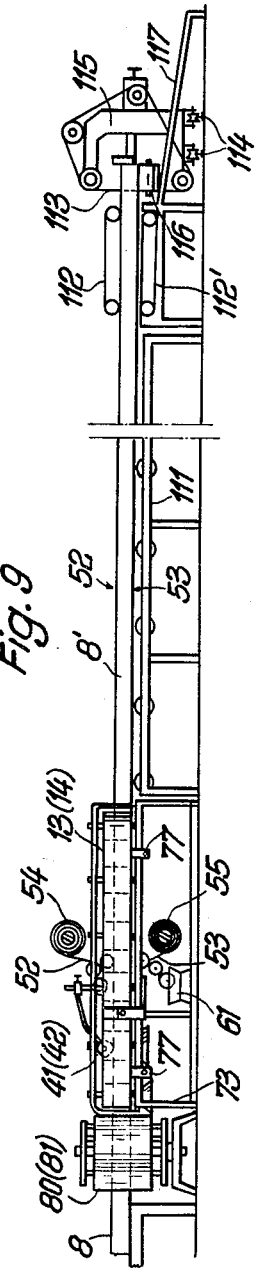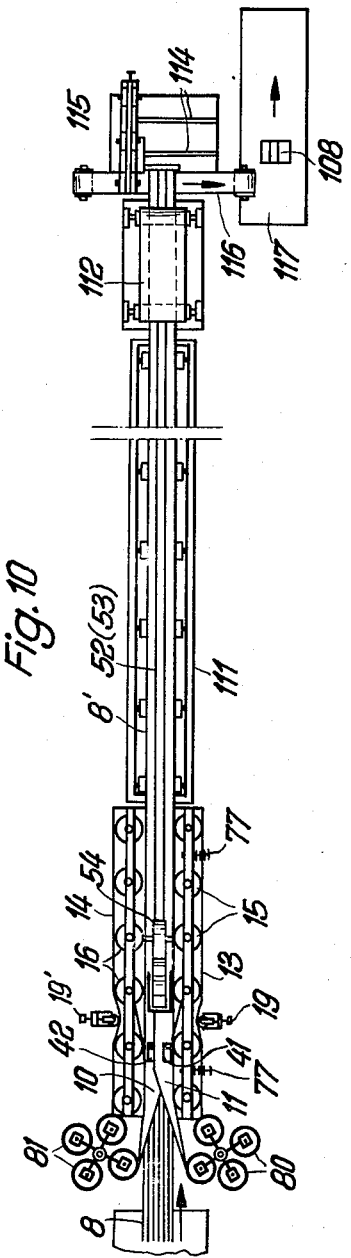

United States Patent Office 2,946,167
Patented July 26, 1960

2,946,167
MACHINE FOR THE MANUFACTURE OF PACKAGES FOR CUT MATERIALS

Ludwig Clemens, Wilhelmstrasse 44/46, Wiesbaden, Germany

Filed Apr. 8, 1959, Ser. No. 804,898

Claims priority, application Germany July 22, 1958

16 Claims. (Cl. 53—137)

This invention relates generally to machines for the manufacture of packages, and relates more particularly to machines for packaging cut materials such as packing materials, wadding, sound or heat absorbing materials or the like, and preferably corrugated paper or cardboard.

Corrugated paper or cardboard is usually shipped in cut form. It must accordingly be made into convenient packages for shipping and to avoid damage of the material in transit. Conventionally, packing materials of the type referred to are initially assembled in the form of a loop that is composed of layers of the material superposed and tightly stacked. Such a loop of stacked material may then be further processed by wrapping it in a packing paper and cutting it into convenient lengths. The thus obtained packages require that the materials are securely tied together so that they can not be damaged during transport and storage or their contents become mixed up. On the other hand, it is important that the packages may readily be opened for access to the contents thereof. The finished packages may be provided with a stamp or label for numbering the packages or otherwise designating or marking their contents.

It is accordingly among the principal objects of the instant invention to provide a machine for the manufacture of packages of the type referred to which operates in a simple manner and has a large output.

Another object of the invention is to provide a machine of this type which can be adjusted rapidly and within wide limits to accommodate material of various dimensions, to be packaged.

A machine in accordance with the instant invention may for example include two parallel rows of at least two guide cylinders each having parallel axes and disposed adjacent to each other. At least one supply roll may be provided for delivering the packing material. This supply roll may be disposed in front of the first guide cylinders near their lower edges and have an axis arranged parallel to the axes of the guide cylinders. Alternatively, at least one pair of such supply rolls may be provided, the two supply rolls being arranged opposite each other and separated by about the width of the package to be made. The pair of supply rolls may have their axes disposed parallel to the axes of the guide cylinders. Furthermore, guide means which may be fixed or movable may be provided for the packing material fed from the supply rolls. These guide means may be disposed either below or above or else both above and below the space between the two rows of guide cylinders. The guide means may be so arranged that the packing material which may be supplied in the form of one or two bands eventually surrounds the material to be packaged, that is, the corrugated paper. The packing material may be fed to the corrugated paper strips either before their entrance into the guide path formed by the guide cylinders, or during their passage through the guide cylinders. The packing material may be fed and guided in such a manner that the ends thereof overlap. Lastly, there may be provided a device for feeding and applying a closure strip which may be applied to one or both surfaces of the material to be packaged to provide a closed envelope of generally rectangular cross section enclosing the corrugated paper.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Fig. 1 is a fragmentary plan view of the machine of the invention;

Fig. 2 is a fragmentary side elevational view of the machine of Fig. 1;

Fig. 3 is a front elevational view of the machine;

Fig. 4 is a side elevational view, parts being broken away, of a guide cylinder with its guide band;

Fig. 5 is a fragmentary plan view of the device for adjusting the operating width of the machine according to the invention;

Fig. 6 is a perspective view of a finished package made by means of the machine of the invention;

Fig. 7 is a fragmentary plan view of a bearing for one of the supply rolls for the packing material;

Fig. 8 is a fragmentary front elevational view of the bearing of Fig. 7;

Fig. 9 is a schematic side elevtional view of the machine of the invention cooperating with a cross cutting device of known design; and Fig. 10 is a plan view of the device illustrated in Fig. 9.

The machine of the invention is supplied with a skein-like band 8 which consists of superposed tightly packed strips of the material to be packaged. The band 8 may be made in any suitable and well-known manner or by utilizing other suitable machinery. The band 8 is passed between two rows of guide cylinders 15 and 16, and each row of guide cylinders is surrounded by an endless guide band 13, 14. Before entering the space between the rows of guide cylinders 15 and 16, the band 8 passes a radial arm holder 50, 51 for rolls of the packing material. There the band 8 is covered on all sides by two strips 10, 11 of packing material, preferably strong paper.

The radial arms of the arm holder 50, 51 are mounted tiltably about vertical shafts 109, 110 which are mounted on bearing blocks 109′, 110′. Supply rolls 80, 81 for the packing material are secured to shafts 82, 83. The shafts 82, 83 are journalled in bearings 85, 86 (Figs. 7 and 8) which are disposed at the ends of radial arms 84. One portion, namely a fixed portion 85 of these bearings, is rigidly secured to the radial arms 84, for example, by welding. The other, removable, bearing portion 86 is provided with set pins 87, 88 which fit corresponding holes in the fixed portion 85. There are provided projections 89, 90 which fit corresponding slots disposed on the inner surfaces of fork-like ends of the radial arms 84.

The bearings 85, 86 are provided with a longitudinal bore through which may be passed a stop bar 91 having a ring-shaped handle 92. The handle 92 may be secured by a chain 93 to the arms 84 to prevent loss of the bar 91. The bar 91 may be pushed through the bearing portion 86 and the oppositely disposed forked ends of the arms 84 to secure and to tie the bearing together. When it is desired to change one of the rolls 80, the bar 91 may be removed to enable the removal of the bearing portion 86. The stop bar 91 may be provided with a bore or a slot-like opening at its end to receive a locking pin 94 which is also secured to the arms 84 by a chain 95.

The described simple arrangement of the bearings for receiving the rolls 80, 81 of the packing material in the arms 84 of the rotatable radial arm holder 50, 51 facilitates a rapid exchange of these rolls.

The guide cylinders 15, 16 are surrounded by endless, flexible guide bands 13, 14, preferably made of rubber or the like. The inner surfaces of the guide bands 13, 14 are provided with special guide strips 96 (Fig. 4). The guide strips also comprise a flexible material, preferably rubber and may, for example, be commercially available cone belts. The guide strips 96 are received by grooves of corresponding cross section provided on the outer circumferences of the guide cylinders 15, 16, and serve the purpose of preventing the guide bands 13, 14 from sliding off.

The guide cylinders 15, 16 are journalled in bearing frames 72, 76, at least the frame 76 of which is arranged to be adjusted at right angles to the longitudinal axis of the machine within the machine frame 73. As shown in Fig. 5, the bearing frame 76 is adjusted, for example, by means of adjustment screw spindles 74, 77 and jam nuts 75 which are secured to the frame 76. The adjustment screws are preferably disposed at two portions of the machine frame 73 which are sufficiently far apart to prevent tilting of the frame 76. They may be coupled together and driven by an adjustment motor, not shown in the drawings for the sake of simplicity. By means of this adjustment device, the working width of the machine may be accommodated to various widths of the skein-like band to be worked. Further, the adjustment device serves the purpose to adjust the tension necessary for the packaging, and for pressing the individual layers of the band upon each other with a force sufficient to obtain a firm package.

The tension of the endless guide bands 13, 14 may be controlled by adjusting rolls 18, 18' (Figs. 1–3) which are movably disposed in the path of the guide bands. The adjusting rolls 18, 18' are mounted in U-shaped frames 102, 103 which are adjustable by means of adjusting screws 19, 19'. Accordingly, by turning the screws 19 or 19', the adjustment rolls 18, 18' may be pressed against their respective bands 13 and 14, or be removed therefrom, to control the tension of the guide bands. The screws 19, 19' may be locked by jam nuts.

One of each set of the guide cylinders 15 and 16, or all of them, are driven by a drive motor with controllable speed, not shown in the drawings, for instance by means of bevel gears secured to their shafts.

Between the guide cylinders 15, 16 there are disposed guide rolls 41, 42 (Figs. 1–3). The guide rolls 41, 42 preferably comprise rubber and are secured to supporting columns 104, 105 by means of tiltable levers 43, 44. The guide rolls rest by virtue of their own weight and that of the levers 43, 44 on the bands 10, 11 of packing material. As will be presently explained, the bands of packing material are folded over the skein-like band 8 and the rolls 41, 42 cause the folding of the band of packing paper and hence prepare it for a subsequent gluing or other manner of connecting the ends of the paper band together.

Sleeves 107 are secured to the columns 104, 105 by set screws 106, while the levers 43, 44 are linked to the sleeves by joints 108. Hence by rotating the sleeves 107, the distance of the rolls 41, 42 from each other or from the center of the bands 8, 10, 11 may be adjusted to accommodate the machine to different dimensions of the packages.

Bands or strips of packing material 10, 11 are supplied initially from the supply rolls 80 and 81 in the form of plane bands. Thereafter the bands 10, 11 follow along the sides of the skein-like band 8 to be packaged. In order to fold the lower sides of the paper strip about the band 8, there may be provided guide means which have a different angle of inclination to lift gradually the bands or strips of packing material 10, 11 towards the lower surface of the band 8. The guide means may take the form of stationary curved surfaces, tilting or turning rods or the like. Alternatively, the guide means may be formed of rotating parts, for example rotating, driven or loosely rotating cones 46 to 49 (see particularly Fig. 2) having a successively different inclination of their conical surfaces.

The guide cones 46—49 are journalled in the machine frame 73 and are preferably disposed on both sides of the machine below the guide cylinders 15, 16; they may be secured to the shafts of the guide cylinders 15, 16. While the inclination of the surface of the cone 46 is only small and merely effects a minute lifting of the band of packing material 10, 11, the cone 49 is formed almost as a flat plate so that it presses the band 10, 11 of packing material directly against the lower side of the band 8. Thereafter, the band 8 may be acted upon by a device for applying a closure strip and may be moved by transversely extending transport rolls.

The device for applying the closure strip comprises a supply roll 54 or 55 for the closure strip, a roller 56, 56' for applying glue or moisture, a container 60, 61 for glue or moisture, a dispensing roll 58, 59, and a pressure roll 40, 40'. The pressure roll 40, 40' presses a closure strip 52, 53 which has previously been supplied with a coating of glue or the like, or which has a freshly wetted gummed layer, against the partially overlapping edges 20—23 of the bands 10, 11 of the packing material.

The operation of the machine of the invention is as follows:

The width of the path formed between the two rows of cylinders 15, 16 is first adjusted by means of the adjustment screws 74, 77. Also, the distance between the press rolls 42, 44 may be adjusted by rotation of the sleeve 107. Finally, the tension on the bands 13, 14 is adjusted by the device 18, 19. Now the machine may be started to feed the band 8 of superposed layers into the machine. At the same time the band of packing material 10, 11 is fed from the rolls 80, 81.

The upper surface of the band 8 is covered with the paper and the paper is folded by the action of the rolls 42, 44. Similarly, the paper below the band 8 is pressed against the band by means of the cones 46 to 49. Then a closure strip 52 and 53 is attached to secure together the overlapping edges of the paper strips at the upper and lower surfaces of the band 8.

After the skein-like band 8 has been covered with the packing material bands 10, 11 and has passed the devices for applying the closure strips which are disposed above and below the band 8, the packaged band may be removed in its entirety from the machine for further working. Alternatively, the packaged band may directly be fed into a cross-cutting device of suitable well-known construction, where the band is cut into individual finished packages 108, as illustrated in Fig. 6.

The machine of the invention followed by a cutting device as referred to above is illustrated in Figs. 9 and 10.

The bank 8' provided with the closure strips 52, 53 leaves the device for applying the closure strips and then enters a roller bed or track 111. Following the roller track 111, there is provided a transverse cutting device 115 that is provided with an endless rotating band knife 113. The cutting device 115 is movable by rails 114 in a direction transverse to the direction of movement of the band. In order to stop and advance the band during the cutting operation, the band is disposed between two endless transport bands 112, 112'.

The cut packages 108 are transported by a transport band 116 and delivered to a distributing table 117 which is disposed along the side of the band 8'.

If desired, the band 8 may be fed to the machine of the invention by two alternately operating winding devices or machines by means of a switch-like feeding mechanism. In this case, at any time one of the two devices delivering the skein-like band to be packaged is connected to the machine of the invention, while the other device in the meantime manufactures a new skein-like band.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a machine, for use in the manufacture of packages from packaging material such as corrugated paper or corrugated cardboard, the combination of two rows of guide cylinders including input cylinders, each row including at least two guide cylinders having parallel axes and disposed adjacent each other, said rows being disposed parallel to each other with a predetermined spacing for advancing a band of stacked layers of the packaging material, at least one first supply roll actuatable for supplying packing material disposed in front of the input cylinders and having its axis disposed parallel to those of said guide cylinders, guide means disposed between said first supply roll and the space defined between said rows and operable for wrapping the packing material about the band of stacked layers to be packaged in such a manner that the edges of the packing material overlap about the band, and a device operable for supplying and applying a closure strip to the overlapping edges of the packing material and including at least one second supply roll for supplying the closure strip.

2. In a machine as claimed in claim 1, wherein said device for supplying and applying a closure strip further includes a roll for applying moisture to the closure strip, a container adapted to contain moisture and being in operative relationship with said moisture applying roll, and a press roll operable for pressing the moistened strip against the overlapping edges of the packing material band.

3. In a machine as claimed in claim 1, wherein an advancing mechanism is disposed at the exit end of the guide cylinders and is operable for advancing the packaged band of layers, and a transverse cutting mechanism is movable transversely to the direction of movement of the band of layers and is operable for cutting the band of layers into packages of desired length.

4. A machine for the manufacture of packages from packaging material such as corrugated paper or corrugated cardboard, said machine comprising two rows of guide cylinders including front guide cylinders, each row including at least two guide cylinders having parallel axes and being disposed adjacent each other, said rows being disposed parallel to each other with a predetermined spacing for advancing a band of stacked layers of the packaging material, two packing sheet supply rolls operable for supplying elongated packing sheets disposed in front of the front guide cylinders and spaced apart by about the distance between said rows, said packing sheet supply rolls having axes parallel to those of said guide cylinders, guide means disposed between said packing sheet supply rolls and the space between said rows and actuatable for wrapping said two packing sheets about the band of stacked layers to be packaged in such a manner that the edges of the packing material overlap about an upper and a lower surface of the band, said guide means including idle rolls disposed to engage said upper and lower surfaces of the band, means operable for urging said idle rolls against the overlapping edges of the packing sheets, and a device operable for supplying and applying closure strips to the packing sheets, said device including closure strip supply rolls disposed above and below the band and actuatable for supplying the respective closure strips to the overlapping edges of the packing sheets on said upper and lower surfaces of the band.

5. A machine, as claimed in claim 4, wherein there are provided fixed supporting colmuns, a rotatable member adjustably secured to each of said columns, a tiltable lever operable for interconnecting each of said members to one of said idle rolls, said idle rolls engaging the upper surface of said band, whereby the distance of said idle rolls from each other may be adjusted by rotating said members about said columns.

6. A machine, for use in manufacturing packages from packaging material such as corrugated paper or corrugated cardboard, said machine comprising, in combination, two rows of guide cylinders disposed parallel and spaced from each other and including band entrance cylinders, each row including at least two guide cylinders having parallel axes and disposed adjacent each other for advancing a band of stacked layers of packaging material, two supply rolls, each supplying a band of packing material disposed in front of the band entrance guide cylinders and spaced from each other by approximately the distance between said rows, said supply rolls having axes parallel to those of said guide cylinders, guide means disposed between said supply rolls and the space defined between said rows and operable for wrapping said two packing bands about the band of stacked layers to be packaged in such a manner that the edges of the two bands of packing material overlap about the upper and lower surfaces of the band of layers, said guide means including a plurality of guide members, each having a guide surface of a different inclination thereby to guide the packing bands about said surfaces of the band of layers, and a device operable for supplying and applying closure strips to the overlapping edges of the packing bands and including a closure strip supply roll disposed above and below the band of layers for supplying respective closure strips to said upper and lower surfaces of the band of layers.

7. A machine, as claimed in claim 6, wherein said guide members include rotating cones.

8. A machine, as claimed in claim 7, wherein said guide cylinders are provided with shafts, and said cones are secured to said shafts, whereby said guide cylinders and cones rotate in unison.

9. A machine, as claimed in claim 8, together with a machine frame operable for supporting said guide cylinders, said frame having bearing means operative for rotatably supporting said shafts, said shafts extending below said machine frame for supporting said cones below said machine frame.

10. A machine, for use in packing a band of packaging material such as corrugated paper or corrugated cardboard disposed in tightly stacked layers, said machine comprising, in combination, two rows of guide cylinders disposed parallel to each other and spaced apart from each other for a predetermined distance and including band entrance cylinders, each row including two guide cylinders having parallel axes and disposed adjacent each other for advancing the band of layers, two sets of supply rolls operable for supplying bands of packing material, each of said sets being disposed in front of the band entrance guide cylinders and spaced apart from each other approximately by the width between said rows, a rotatably mounted supply mechanism having a plurality of radial arms, a vertical shaft mounted in each of said arms and operable for rotatably supporting one of said supply rolls, guide means disposed between said supply rolls and the space defined between said rows and operable for wrapping two bands of packing material about the band of layers in such a manner that the edges of the bands of packing material overlap about the band, and a device actuatable for feeding and applying closure strips to the overlapping edges of the packing material to effect tight wrapping of the packing material about the band of layers.

11. A machine, as claimed in claim 10, together with a bearing operative for mounting each of said vertical shafts in one of said radial arms, each of said bearings comprising two portions, one of said portions being removable, one of said portions including set pins and the other portion having holes adapted for receiving said set pins, said removable portion having transverse bores and its associated radial arm having bores, and a stop bar operable to be inserted into said bores, whereby said removable portion may be secured to its associated arm.

12. A machine, for use in manufacturing packages from packaging material such as corrugated paper or corrugated cardboard disposed in tightly stacked layers, said machine comprising, in combination, two rows of guide cylinders disposed parallel to each other and spaced apart from each other for a predetermined distance and including entrance guide cylinders, each row including at least two guide cylinders having parallel axes and disposed adjacent each other, an endless flexible guide band surrounding each row and being operative for guiding and advancing said stacked layers, two sheet supply rolls operable for supplying elongated sheets of packing material disposed in front of the entrance guide cylinders and spaced apart from each other for about the distance defined between said guide bands, said sheet supply rolls having axes parallel to those of said guide cylinders, guide means disposed between said sheet supply rolls and the space formed between said guide bands and operable for wrapping the two sheets of packing material about the stacked layers to be packaged in such a manner that the edges of the packing sheets overlap about the layers, and a device for supplying and applying closure strips to the packing sheets and including strip supply rolls disposed about the layers for supplying their respective closure strips to the overlapping edges of the packing sheets at surfaces of the layers.

13. A machine, as claimed in claim 12, wherein each of said endless guide bands is provided on its inner surface with flexible cone belts disposed parallel to each other along the direction of movement of said guide bands, and wherein said guide cylinders have peripheral grooves adapted to receive said cone belts.

14. A machine, as claimed in claim 12, together with, tension rolls, and means operable for adjustable advancing and respectively retracting said tension rolls into and respectively out of the path of said guide bands thereby to adjust the tension thereof.

15. A machine, for use in packaging a band of packaging material such as corrugated paper or corrugated cardboard arranged in tightly stacked layers, said machine comprising, in combination, a first fixed machine frame, a first row of guide cylinders, each having a vertical shaft mounted in said machine frame, a second adjustable frame, means operable for adjusting said second frame in a direction parallel to said first row of guide cylinders, a second row of guide cylinders, each having a vertical shaft mounted in said second frame, said rows being disposed parallel to each other and having an adjustable distance from each other for advancing said band of layers, at least one first supply roll for supplying a band of packing material disposed in front of the front guide cylinders and having its axis disposed parallel to those of said guide cylinders, guide means disposed between said first supply roll and the space defined between said rows for wrapping the band of packing material about the band of layers to be packaged in such a manner that the edges of the packing material band overlap about the band of layers, and a device for supplying and applying a closure strip to the overlapping edges of the packing material band and including at least a second supply roll for supplying the closure strip.

16. A machine as defined in claim 15, wherein screw spindles are disposed in said first frame and in said second frame at two portions thereof spaced apart from each other, for adjusting the position of said second frame with respect to that of said machine frame, thereby to adjust the distance between said rows to accommodate bands of stacked layers of different widths.

References Cited in the file of this patent

UNITED STATES PATENTS

| | | |
|---|---|---|
| 1,946,056 | Birdsey | Feb. 6, 1934 |
| 2,008,473 | Shephard | July 16, 1935 |
| 2,677,222 | Frattinger | May 4, 1954 |
| 2,737,002 | Demler | Mar. 6, 1956 |